US006946941B2

(12) United States Patent
Chell

(10) Patent No.: US 6,946,941 B2
(45) Date of Patent: Sep. 20, 2005

(54) PERMANENT MAGNET ASSEMBLY

(75) Inventor: Jeremy Chell, Madison, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 0 days.

(21) Appl. No.: 10/924,711

(22) Filed: Aug. 24, 2004

(65) Prior Publication Data

US 2005/0046533 A1 Mar. 3, 2005

Related U.S. Application Data

(60) Provisional application No. 60/499,134, filed on Aug. 29, 2003.

(51) Int. Cl.[7] .................................................. H01F 7/02
(52) U.S. Cl. ......................... 335/306; 335/296; 335/297
(58) Field of Search .................................. 335/296–306

(56) References Cited

U.S. PATENT DOCUMENTS

| | | | | |
|---|---|---|---|---|
| 2,613,246 | A | * | 10/1952 | Spodig ........................ 335/305 |
| 4,033,734 | A | | 7/1977 | Steyert, Jr. et al. |
| 4,069,028 | A | | 1/1978 | Brown |
| 4,107,935 | A | | 8/1978 | Steyert, Jr. |
| 4,112,699 | A | | 9/1978 | Hudson, III et al. |
| 4,203,740 | A | | 5/1980 | Vaseen |
| 4,332,135 | A | | 6/1982 | Barclay et al. |
| 4,392,356 | A | | 7/1983 | Brown |
| 4,408,463 | A | | 10/1983 | Barclay |

(Continued)

FOREIGN PATENT DOCUMENTS

| | | |
|---|---|---|
| FR | 2 574 913 | 6/1986 |
| JP | 62 106271 | 5/1987 |
| RU | 2 040 704 | 7/1995 |

OTHER PUBLICATIONS

Supplementary European Search Report issued Feb. 25, 2005 on EP 02795829.
Supplementary Partial European Search Report issued Jan. 4, 2005 on EP 02795829.
C.R. Cross, et al., "Optimal Temperature–Entropy Curves for Magnetic Refrigeration," Advances in Cryogenic Engineering, vol. 33, pp. 767–776, 1988, and Cryogenic Engineering Conference, Jun., 1987.
L.D. Kirol, et al., "Rotary Recuperative Magnetic Heat Pump," in Advances in Cryogenic Engineering, 1988.
A.J. DeGregoria, et al., "Test Results of an Active Magnetic Regenerative Refrigerator," Advances in Cryogenic Engineering, vol. 37B, and Cryogenic Engineering Conf., Jun. 11–14, 1991, Huntsville, Alabama.
A.J. DeGregoria, et al., "Modeling the Active Magnetic Regenerator," Advances in Cryogenic Engineering, vol. 37B, and Cryogenic Engineering Conf., Jun. 11–14, 1991, Huntsville, Alabama.
"The Big Chill . . . Magnetic Refrigeration Technology Makes a Cool Debut," the "Insider," Ames Laboratory, Department of Energy, Ames, Iowa, Feb., 1997.
"New Fridge Technology on the Horizon," The Capital Times, Feb. 21, 1997.
K.A. Gschneidner, Jr., "Magnetic Refrigeration," in Rare Earths: Science, Technology and Applications III, The Minerals, Metals and Materials Society, 1997, pp. 209–221.
S. J. Lee at al, "Permanent Magnet Array for the Magnetic Refrigerator", Journal of Applied Physics, vol. 91, No. 10, May 15, 2002.
S. J. Lee et al., "Modeling and simulation of a permanent magnet array in elliptical configurations", Proceedings of the 2000 International Conference on Modeling and Simulation of Microsystems.

*Primary Examiner*—Ramon M. Barrera
(74) *Attorney, Agent, or Firm*—Foley & Lardner LLP

(57) ABSTRACT

A permanent magnet assembly is disclosed that is adapted to provide a magnetic field across an arc-shaped gap. Such a permanent magnet assembly can be used, for example, to provide a time-varying magnetic field to an annular region.

50 Claims, 4 Drawing Sheets

U.S. PATENT DOCUMENTS

| | | | |
|---|---|---|---|
| 4,441,325 | A | 4/1984 | Bon-Mardion et al. |
| 4,453,114 | A | 6/1984 | Nordlund |
| 4,459,811 | A | 7/1984 | Barclay et al. |
| 4,483,341 | A | 11/1984 | Witteles |
| 4,507,927 | A | 4/1985 | Barclay |
| 4,507,928 | A | 4/1985 | Johnson |
| 4,514,987 | A | 5/1985 | Pundak et al. |
| 4,532,770 | A | 8/1985 | Hakuraku et al. |
| 4,625,519 | A | 12/1986 | Hakaraku et al. |
| 4,702,090 | A | 10/1987 | Barclay et al. |
| 4,704,871 | A | 11/1987 | Barclay et al. |
| 4,727,721 | A | 3/1988 | Peschka et al. |
| 4,727,722 | A | 3/1988 | Kirol |
| 4,785,636 | A | 11/1988 | Hakuraku et al. |
| 4,901,047 | A | 2/1990 | Wipf |
| 4,916,907 | A | 4/1990 | Munk et al. |
| 5,012,060 | A | 4/1991 | Gerard et al. |
| 5,024,059 | A | 6/1991 | Noble |
| 5,091,361 | A | 2/1992 | Hed |
| 5,156,003 | A | 10/1992 | Yoshiro et al. |
| 5,162,771 | A | 11/1992 | Abele |
| 5,165,242 | A | 11/1992 | Chang |
| 5,177,970 | A | 1/1993 | Chang |
| 5,182,914 | A | 2/1993 | Barclay et al. |
| 5,209,068 | A | 5/1993 | Saji et al. |
| 5,249,424 | A | 10/1993 | DeGregoria et al. |
| 5,329,267 | A * | 7/1994 | Endoh et al. ............... 335/222 |
| 5,332,029 | A | 7/1994 | Tokai et al. |
| 5,381,664 | A | 1/1995 | Bennett et al. |
| 5,428,335 | A | 6/1995 | Leupold et al. |
| 5,444,983 | A | 8/1995 | Howard |
| 5,447,034 | A | 9/1995 | Kuriyama et al. |
| 5,495,222 | A | 2/1996 | Abele et al. |
| 5,596,304 | A | 1/1997 | Tatchyn |
| 5,635,889 | A | 6/1997 | Stelter |
| 5,641,424 | A | 6/1997 | Ziolo et al. |
| 5,743,095 | A | 4/1998 | Gschneidner, Jr. et al. |
| 5,790,006 | A | 8/1998 | Abele et al. |
| 5,864,275 | A | 1/1999 | Ohashi et al. |
| 5,886,609 | A | 3/1999 | Stelter |
| 5,887,449 | A | 3/1999 | Pecharsky et al. |
| 5,934,078 | A | 8/1999 | Lawton, Jr. et al. |
| 5,942,962 | A | 8/1999 | Gery |
| 5,963,117 | A | 10/1999 | Ohashi et al. |
| 6,044,899 | A | 4/2000 | Langley et al. |
| 6,079,213 | A | 6/2000 | Driehuys et al. |
| 6,084,498 | A | 7/2000 | Stelter et al. |
| 6,109,343 | A | 8/2000 | Langley et al. |
| 6,250,087 | B1 | 6/2001 | Owada et al. |
| 6,269,648 | B1 | 8/2001 | Hasson et al. |
| 6,293,111 | B1 | 9/2001 | Nacher et al. |
| 6,305,190 | B1 | 10/2001 | Driehuys et al. |
| 6,446,441 | B1 | 9/2002 | Dean |
| 6,467,274 | B2 | 10/2002 | Barclay et al. |
| 6,526,759 | B2 | 3/2003 | Zimm et al. |
| 6,668,560 | B2 | 12/2003 | Zimm et al. |
| 6,680,663 | B1 | 1/2004 | Lee et al. |
| 2002/0053209 | A1 | 5/2002 | Zimm et al. |

* cited by examiner

PERMANENT MAGNET ASSEMBLY

CROSS-REFERENCE TO RELATED APPLICATION

This application claims the benefit of provisional patent application 60/499,134, filed Aug. 29, 2003, the disclosure of which is incorporated by reference.

FIELD OF THE INVENTION

This invention relates generally to magnets, and more particularly to permanent magnet assemblies adapted to provide a time-varying magnetic field to an annular region.

BACKGROUND OF THE INVENTION

Permanent magnets have been used for many years and for many purposes. However, new applications of permanent magnets are driving the development of increasingly sophisticated permanent magnet assemblies. A permanent magnet assembly that can produce a high amplitude magnetic field intensity across a gap is of particular interest, especially in applications of magnetocaloric materials. Magnetocaloric materials near a transition from a ferromagnetic state to a paramagnetic state will warm when magnetized and cool when demagnetized. An apparatus that applies a time-varying magnetic field to magnetocaloric materials can be used to provide heating or cooling, for example in a magnetic refrigerator.

A magnet assembly that produces a magnetic field intensity across a gap can be used to apply a time-varying magnetic field to magnetocaloric materials by moving the magnetocaloric materials in and out of the gap. This can be accomplished, for example, by moving the magnetocaloric materials relative to a stationary magnetic assembly, or by moving a magnet assembly relative to stationary magnetocaloric materials.

Movement of magnetocaloric material relative to a magnet assembly can be accomplished through rotational or translational motion. One approach is to arrange magnetocaloric material in a stationary annular (ring-shaped) structure, and then to rotate a permanent magnet assembly around the ring. Another approach is to arrange magnetocaloric material in an annular structure partially surrounded by a stationary permanent magnet assembly, and then to rotate the annular structure containing the magnetocaloric material. Thus, a permanent magnet assembly specially adapted to provide a time-varying magnetic field to an annular region is of interest, for applications including, but not limited to, magnetic refrigeration.

SUMMARY OF THE INVENTION

A permanent magnet assembly according to the present invention utilizes one or more permanent magnet blocks and one or more flux return sections to form a permanent magnet assembly specially adapted to provide a time-varying magnetic field to an annular region. The permanent magnet assembly can include one or more pole pieces, although this is not required. The annular region can have a rectangular cross-section, although this is not required. A permanent magnet assembly according to the invention can be used, for example, in a rotating bed or rotating magnet magnetic refrigerator apparatus A preferred embodiment of a permanent magnet assembly according to the present invention includes an arc-shaped flux return section formed of magnetically permeable material having a C-shaped cross-section with two ends forming an opening, and upper and lower arc-shaped permanent magnet sections operatively coupled to the ends of the C of the flux return section, wherein an arc-shaped gap is formed between the south end of the upper arc-shaped permanent magnet section and the north end of the lower arc-shaped permanent magnet section.

The flux return section of a permanent magnet assembly according to the invention can be positioned in the interior of the assembly in which case the opening of the flux return section faces outwardly from the central axis of the assembly. Alternatively, the flux return section can be positioned on the exterior of the assembly, at a radius from the central axis of the assembly, in which case the opening of the flux return section faces inwardly toward the central axis of the assembly.

An alternative permanent magnet assembly according to the invention includes an upper flux return section formed of magnetically permeable material with a first arc-shaped upper permanent magnet section at one end and a second arc-shaped upper permanent magnet section at the other end, and a lower flux return section formed of magnetically permeable material with a first arc-shaped lower permanent magnet section at one end and a second arc-shaped lower permanent magnet section at the other end, wherein two arc-shaped gaps are formed between the permanent magnet sections at the ends of the upper and lower flux return sections.

Another permanent magnet assembly according to the invention includes a central permanent magnet section and upper and lower pole pieces formed of magnetically permeable material that include arc-shaped side pole piece portions having pole faces that surround two arc-shaped gaps on the sides of the central permanent magnet section.

A different embodiment of a permanent magnet assembly according to the invention includes an upper flux return section formed of magnetically permeable material with a first arc-shaped upper permanent magnet section at one end and a second arc-shaped upper permanent magnet section at the other end, and a lower flux return section formed of magnetically permeable material with a first arc-shaped lower permanent magnet section at one end and a second arc-shaped lower permanent magnet section at the other end, with a central flux return section between the upper and lower flux return sections, wherein two arc-shaped gaps are formed between the permanent magnet sections at the ends of the upper and lower flux return sections.

A variety of structures can be used in an apparatus according to the invention. For example, the permanent magnet sections shown in the illustrative embodiments herein may be comprised of a single permanent magnet, or these permanent magnet sections may be comprised of one or more multiple permanent magnets and one or more sections of magnetically permeable material to form a magnetic array structure.

Although the illustrative embodiments may show pole pieces or flux return sections formed as unitary structures, these structure may be comprised of individual sections which are operatively coupled together. Similarly, the relative dimensions, shapes, and positions of the permanent magnet sections, pole pieces, or flux return sections can be optimized for a particular application.

A magnet assembly according to the invention can provide a time-varying magnetic field to an annular region. The particular shape and structure of such an annular region can be especially well suited for a rotating bed or rotating magnet magnetic refrigerator. Such a magnet assembly can allow constant access to the annular region that is subject to the time-varying magnetic field intensity, and this can enable components of a magnetic refrigerator such as magnetocaloric material and heat transfer fluid plumbing to be stationary and positioned within the annular region. Alternatively, the magnet assembly can be stationary, and components of a magnetic refrigerator such as magnetocaloric material and heat transfer fluid can rotate within the annular region. A magnet assembly according to the invention can have relatively low operating costs, for example by minimizing space requirements and by minimizing the mass of any moving parts.

Such a magnet assembly can also have relatively low manufacturing costs, for example by reducing the need for precisely machined permanent magnets. Each of the permanent magnet portions of such a magnet assembly can be arc-shaped with a rectangular cross section or generally rectangular in shape, in either case with an orthogonal magnetization vector to minimize production costs. This geometry can be especially well suited to the manufacture of sintered NdFeB magnets by current pressing methods, and the relatively low number of magnet mating surfaces can reduce the number of precision grinding operations that might otherwise be required.

Precisely machined structures used in a magnet assembly according to the invention, for example pole pieces that surround a gap at high magnetic field, may have surfaces that benefit from close tolerances to allow these surfaces to nest closely together with other components of a magnetic refrigerator, such as containers of magnetocaloric materials. By forming any structures requiring precise machining, such as pole pieces, of magnetically permeable material, and operatively coupling those precisely machined structures to rectangular permanent magnet portions, any precision machining of permanent magnet material can be reduced or avoided.

A permanent magnet assembly according to the present invention can be used to generate a time-varying field over an annular region while minimizing the volume, mass, and fabrication cost of such an assembly. The magnetic field in the annular region can be used wherever a stationary or rotating wheel mechanism needs to be magnetized along part of its circumference. The particular design of this structure can allow unimpeded access to the annular region from one side, either from the exterior or from the interior, for example for plumbing carrying heat transfer fluid into and out of beds containing magnetocaloric materials located in the annular region.

A permanent magnet assembly according to the invention can be of particular interest for use in a magnetic refrigeration device. Exemplary magnetic refrigeration devices that use rotational motion are shown in U.S. Pat. No. 6,526,759 and U.S. Pat. App. Pub. No. U.S. 2003/0106323 A1, the disclosures of which are incorporated by reference.

Further objects, features, and advantages of the invention will be apparent from the following detailed description when taken in conjunction with the accompanying drawings.

DETAILED DESCRIPTION OF THE INVENTION

Figure 1:
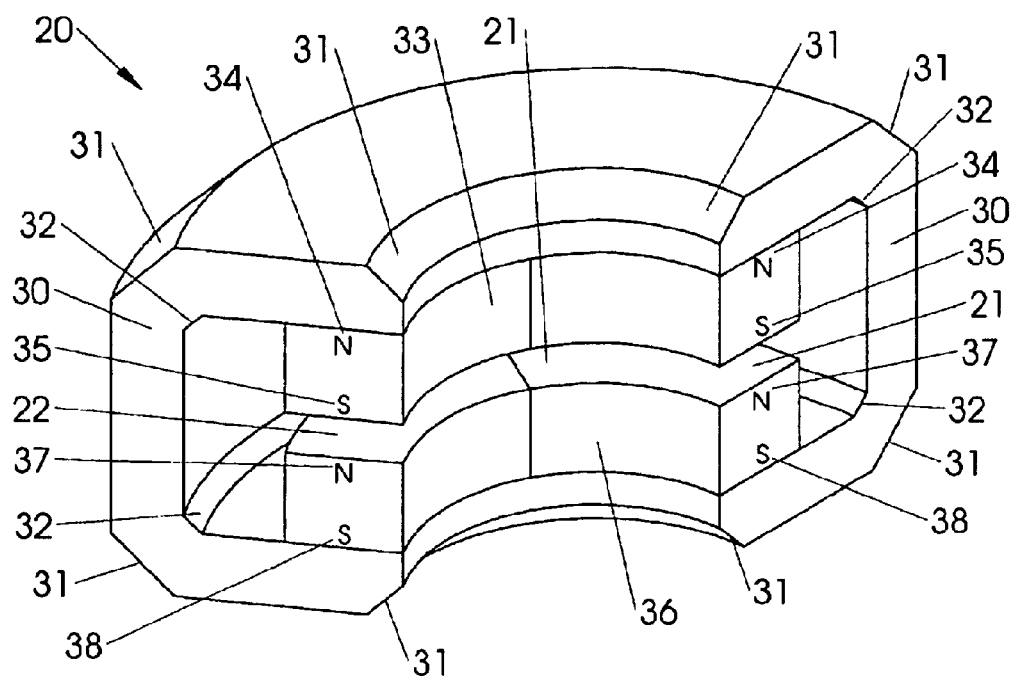
FIG. 1 is a perspective view of a permanent magnet assembly according to the invention with an exterior flux return path.

Referring to the drawings, FIG. 1 is a perspective view of a permanent magnet assembly according to the invention, indicated generally at 20. The permanent magnet assembly 20 surrounds an arc-shaped gap at high magnetic field 21 having a rectangular cross section 22 over an arc length of approximately 120 degrees, although the gap cross-section may have a different shape and the arc length may be greater than or less than 120 degrees. As perhaps best shown in FIG. 2, the permanent magnet assembly 20 is adapted to rotate about an axis of rotation 23, thereby sweeping an annular region 24.

The permanent magnet assembly 20 includes an exterior flux return portion, indicated generally at 30, to provide a return path for the lines of magnetic flux and thereby complete the magnetic circuit. The flux return portion 30 is preferably of sufficient dimension to avoid saturation with magnetic flux, and is preferably shaped and exteriorly positioned at a sufficient distance from the gap at high magnetic field 21 to prevent shunting of the gap flux into the flux return portion 30.

The flux return portion 30 can be formed of any suitable magnetically permeable material, for example a structural alloy such as low-carbon steel that has the ability to carry flux, or a specifically permeable material intended for use in magnetics such as the material sold by High Temp Metals of California, USA under the trademark Permendur 2V, or a combination of these materials, with or without additional non-permeable materials used, for example, to provide structural support. The flux return portion 30 can include one or more chamfered corners 31, for example along the outer corners, or filled-in corners 32, for example along interior corners, to optimize flux return performance while minimizing stray flux and assembly weight.

The permanent magnet assembly 20 includes an upper permanent magnet portion, indicated generally at 33, having a North pole 34 (marked "N") and a South pole 35 (marked "S"), and a lower permanent magnet portion, indicated generally at 36, having a North pole 37 and a South pole 38.

Figure 2:
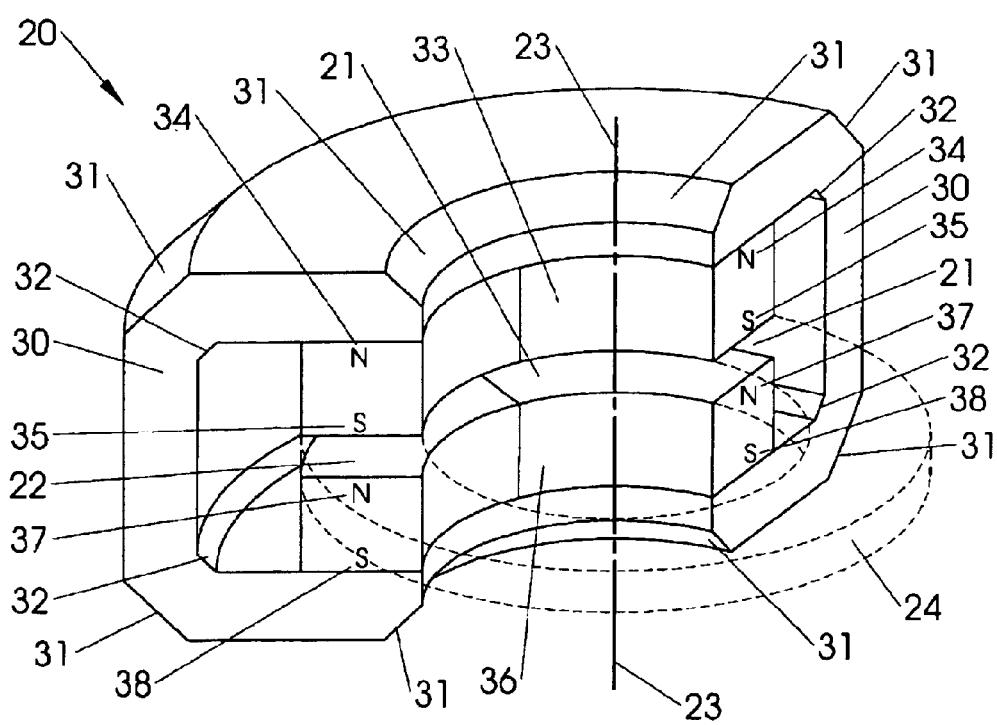
FIG. 2 is a perspective view of the permanent magnet assembly of FIG. 1, showing the axis of rotation and the annular region swept by the rotation of the permanent magnet assembly.

The upper permanent magnet portion 33 and lower permanent magnet portion 36 can be formed of any suitable permanent magnet material, for example of the type sold by Sumitomo Special Metals of Japan under the trademark Neomax 50. As shown in FIGS. 1 and 2, the South pole 35 of the upper permanent magnet portion 33 and the North pole 37 of the lower permanent magnet portion 36 face the gap at high magnetic field 21.

Figure 3:
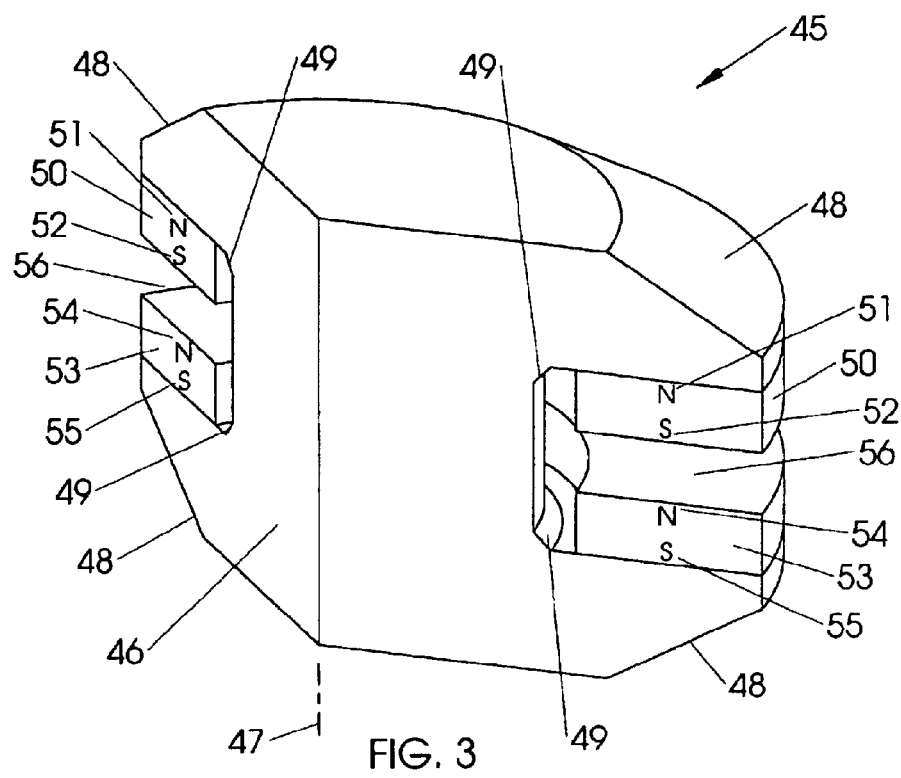
FIG. 3 is a perspective view of a permanent magnet assembly according to the invention with an interior flux return path.

FIG. 3 is a perspective view of a permanent magnet assembly according to the invention, indicated generally at 45, having an interior flux return path. The permanent magnet assembly 45 may be especially useful in rotating magnet applications where the rotational moment of inertia is of concern.

The permanent magnet assembly 45 surrounds an arc-shaped gap at high magnetic field 56 having a rectangular cross section over a given arc length, although this is not required and the cross-section may have different shapes and the arc length may be greater than or less than the arc length of the permanent magnet assembly 45. The permanent magnet assembly 45 includes an interior flux return portion, indicated generally at 46, to provide a return path for the lines of magnetic flux and thereby complete the magnetic circuit. The permanent magnet assembly 45 can be adapted to rotate about an axis of rotation 47, thereby sweeping an annular region.

The flux return portion 46 of the permanent magnet assembly 45 is preferably of sufficient dimension to avoid saturation with magnetic flux and to avoid flux leakage elsewhere in the wheel. The flux return portion 46 is preferably shaped and interiorly positioned at a sufficient distance from the gap at high magnetic field 56 to prevent shunting of the gap flux into the flux return portion 46. The flux return portion 46 can be formed of any suitable magnetically permeable material, for example of the types discussed above.

Although the interior flux return portion 46 may come to an abrupt corner at the central axis of the assembly, other shapes may be used depending on flux density, mounting considerations, and counter-weighting among other factors. The flux return portion 46 can include one or more chamfered corners 48, for example along the outer corners, or filled-in corners 49, for example along interior corners, to optimize flux return while minimizing stray flux, assembly weight, and rotational moment of inertia.

The permanent magnet assembly 45 includes an upper permanent magnet portion, indicated generally at 50, having a North pole 51 (marked "N") and a South pole 52 (marked "S"), and a lower permanent magnet portion, indicated generally at 53, having a North pole 54 and a South pole 55. The upper permanent magnet portion 50 and lower permanent magnet portion 53 can be formed of any suitable permanent magnet material, for example of the types discussed above. As shown in FIG. 3, the South pole 52 of the upper permanent magnet portion 50 and the North pole 54 of the lower permanent magnet portion 53 surround the gap at high magnetic field 56.

Figure 4:
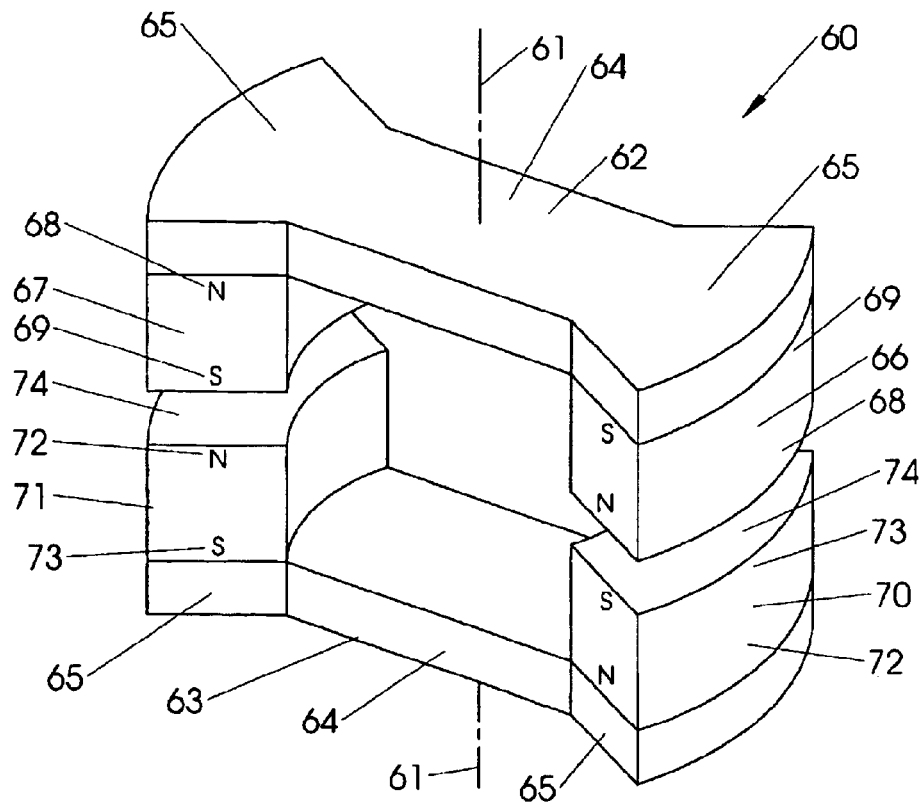
FIG. 4 is a perspective view of another permanent magnet assembly according to the invention with upper and lower interior flux return paths.

FIG. 4 is a perspective view of another permanent magnet assembly according to the invention, indicated generally at 60, having upper and lower interior flux return paths and providing two gaps at high magnetic field. Compared to the permanent magnet assemblies of FIGS. 1 and 3 which use a single flux return path, the lines of flux travel a comparatively shorter distance from one magnetic pole to the next in the permanent magnet assembly 60, such that the two flux return paths in the permanent magnet assembly 60 can be individually less massive that the single flux return paths of FIGS. 1 and 3. This property can make the permanent magnet assembly 60 especially useful in rotating magnet applications that require at least some central free space along the axis of rotation where the rotational moment of inertia is also of concern.

As shown in FIG. 4, the permanent magnet assembly 60 surrounds two arc-shaped gaps at high magnetic field 74 having a rectangular cross section over an arc length, where each arc-shaped gap extends approximately 60 degrees, although this is not required and the gap cross-sections may have a different shape and the arc lengths may be greater than or less than 60 degrees. The permanent magnet assembly 60 includes two interior flux return portions, an upper flux return portion, indicated generally at 62, and a lower flux return portion, indicated generally at 63, to provide a return path for the lines of magnetic flux and thereby complete the magnetic circuit. The permanent magnet assembly 60 can be adapted to rotate about an axis of rotation 61, thereby sweeping an annular region.

The upper flux return portion 62 and lower flux return portion 63 each include a central portion 64 extending outward from the axis of rotation. The upper flux return portion 62 and lower flux return portion 63 each preferably also include horizontally tapered portions 65 that concentrate the lines of flux in the central portion 64. A non-permeable axial link along the axis of rotation 61 that connects the upper flux return portion 62 and the lower flux return portion 63 through the center of the assembly can be used to provide structural support.

The upper flux return portion 62 and lower flux return portion 63 of the permanent magnet assembly 60 are preferably of sufficient dimension to avoid saturation with magnetic flux and to avoid flux leakage elsewhere in the wheel. The upper flux return portion 62 and lower flux return portion 63 are preferably shaped and positioned at a sufficient distance from the gaps at high magnetic field 74 to prevent shunting of the gap flux into those flux return portions. The upper flux return portion 62 and lower flux return portion 63 can be formed of any suitable magnetically permeable material, for example of the types discussed above.

The upper flux return portion 62 has a first end operatively coupled to a first upper permanent magnet portion 66 and a second end operatively coupled to a second upper permanent magnet portion 67, with each of the upper permanent magnet portions 66 and 67 having a North pole 68 (marked "N") and a South pole 69 (marked "S"). Similarly, the lower flux return portion 63 has a first end operatively coupled to a first lower permanent magnet portion 70 and a second end operatively coupled to a second lower permanent magnet portion 71, with each of the lower permanent magnet portions 70 and 71 having a North pole 68 (marked "N") and a South pole 69 (marked "S").

As shown in FIG. 4, the polar orientations of the upper and lower permanent magnet portions 66, 67, 70, and 71 are aligned to produce a circular flux around the magnetic circuit formed by the permanent magnet portions and the flux return portions. Relative to the first lower permanent magnet portion 70 and the first upper permanent magnet portion 66 which are aligned together in one direction, the second upper permanent magnet portion 67 and the second lower permanent magnet portion 71 are aligned together in the opposite direction, thereby forming a circular flux loop.

The upper permanent magnet portions 66 and 67 and the lower permanent magnet portions 70 and 71 can be formed of any suitable permanent magnet material, for example of the types discussed above. As shown in FIG. 4, the South pole 73 of the first lower permanent magnet portion 70 and the North pole 68 of the first upper permanent magnet portion 66 surround one gap at high magnetic field 74, and the South pole 69 of the second upper permanent magnet portion 67 and the North pole 72 of the second lower permanent magnet portion 71 surround a second gap at high magnetic field 74.

Although in FIG. 4 the upper flux return portion 62 and the lower flux return portion 63 have a uniform thickness in the vertical direction, and although these flux return portions join the upper and lower permanent magnet portions 66, 67, 70, and 71 at abrupt corners, other shapes may be used depending on flux density, mounting considerations, and counter-weighting among other factors. The flux return portions can include one or more chamfered or rounded corners, for example along the outer corners or edges of the flux return portions, or filled-in corners, for example along the junction between the flux return portions and the permanent magnet portions, to optimize flux return while minimizing stray flux and assembly weight.

Figure 5:
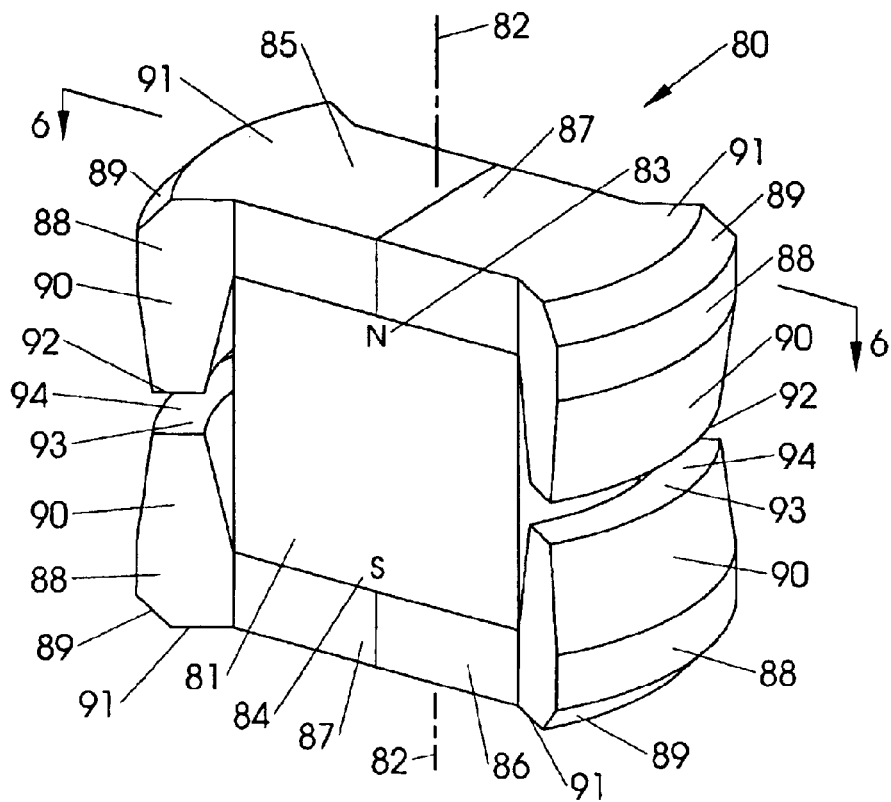
FIG. 5 is a perspective view of an alternative permanent magnet assembly according to the invention with a central magnet and upper and lower pole pieces.

FIG. 5 is a perspective view of an alternative permanent magnet assembly according to the invention indicated generally at 80, with a central magnet and upper and lower pole pieces and providing two gaps at high magnetic field. In the permanent magnet assembly 80, the majority of the assembly sits within the outer diameter of the wheel, thereby minimizing the rotational moment of inertia of the assembly.

As shown in FIG. 5, the permanent magnet assembly 80 includes a central permanent magnet portion 81 with an upper pole piece 85 and a lower pole piece 86 which direct the magnetic flux from the central permanent magnet portion 81 through two arc-shaped gaps at high magnetic field 94 over a given arc length. Each gap typically extends 60 degrees, but this is not required and greater or lesser arc lengths can be used. The permanent magnet assembly 80 can be adapted to rotate about an axis of rotation 82, thereby sweeping an annular region.

The central permanent magnet portion 81 of permanent magnet assembly 80 has a North pole 83 (marked "N") and a South pole 84 (marked "S"), with the magnetic vector of the central permanent magnet portion 81 aligned with the axis of rotation 82. The central permanent magnet portion 81 can be formed of any suitable permanent magnet material, for example of the types discussed above.

The permanent magnet assembly 80 includes an upper pole piece, indicated generally at 85, and a lower pole piece, indicated generally at 86. The upper and lower pole pieces 85 and 86 are of similar construction, each having a central pole piece portion 87 with two ends, where each end of each central pole piece bears a side pole piece portion 88. The upper pole piece 85 and lower pole piece 86 can be formed of any suitable magnetically permeable material, for example of the types discussed above. Each side pole piece portion 88 can include one or more chamfered corners 89.

Figure 6:
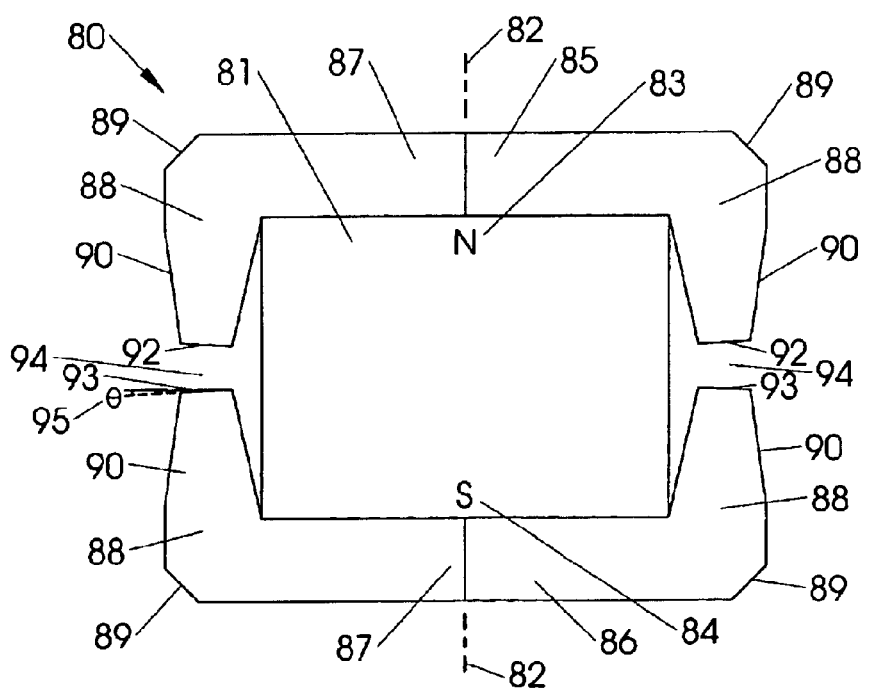
FIG. 6 is a cross-sectional view of the permanent magnet assembly of FIG. 5 taken along the line 6—6 thereof.

FIG. 6 is a cross-sectional view of the permanent magnet assembly of FIG. 5 taken along the line 6—6 thereof. As shown in FIGS. 5 and 6, each end of the upper pole piece 85 terminates in an upper pole face 92. Each end of the lower pole piece 86 terminates in a lower pole face 93. The upper pole faces 92 and the lower pole faces 93 surround the two gaps at high magnetic field 94.

As perhaps best shown in FIG. 6, the side pole piece portions 88 preferably include vertically tapered portions 90, and as perhaps best shown in FIG. 5, the side pole piece portions 88 preferably also include horizontally tapered portions 91. The vertically tapered portions 90 and horizontally tapered portions 91 can be used, for example, to concentrate the magnetic flux into the two gaps at high magnetic field 94. As lines of flux leave the permanent magnet portion 81, the lines of flux converge along the vertically tapered portions 90 and horizontally tapered portions 91, whereby the flux lines crossing the gaps 94 can be at a higher density than the flux lines within the permanent magnet portion 81, providing a magnetic flux density in the gaps 94 that can be greater than the saturation flux density of the magnetic material comprising the permanent magnet portion 81 without the need for a multi-pole magnet array.

The upper pole piece 85 and the lower pole piece 86 of the permanent magnet assembly 80 are preferably of sufficient dimension to avoid saturation with magnetic flux and to avoid flux leakage elsewhere in the wheel. The vertically tapered portions 90, the horizontally tapered portions 91, and the pole faces 92 and 93 are preferably shaped and positioned to place the gaps at high magnetic field 94 at a sufficient distance from the permanent magnet portion 81 to prevent shunting of the gap flux back into the permanent magnet portion 81.

Although the central portions 87 of the upper and lower pole pieces 85 and 86 have a uniform thickness in the vertical direction, other shapes may be used depending on flux density, mounting considerations, and counter-weighting among other factors. The upper and lower pole pieces 85 and 86 may include additional tapering in one or more directions, for example between the central pole piece portion 87 and the upper and lower pole faces 92 and 93, to further concentrate the lines of flux into the gaps 94. The upper and lower pole pieces 85 and 86 may include additional chamfered or rounded corners, for example along the outer corners or edges of the flux return portions, or filled-in corners, for example along the junction between the flux return portions and the permanent magnet portions, to optimize flux density through the gaps 94 while minimizing stray flux and assembly weight.

As perhaps best shown in FIG. 6, the cross-section of the gaps at high magnetic field 94 can be trapezoidal, with an angle theta 95 between the horizontal and the lower pole face 93. There can also be a complementary angle between the horizontal and the upper pole face 92, although this is not required.

The angle theta 95 is positive in the permanent magnet assembly 80 of FIGS. 5 and 6, such that the interior dimension of the cross-section of the gaps at high magnetic field 94 is less than the exterior dimension of that cross-section, although this is not required. The angle theta 95 can also be zero, in which case the interior dimension of the cross-section of the gaps at high magnetic field would be equal to the exterior dimension of that cross-section. The angle theta 95 can also be negative, in which case the interior dimension of the cross-section of the gaps at high magnetic field would be greater than the exterior dimension of that cross-section.

Although the upper pole faces 92 and the lower pole face 93 are shown as essentially planar, this is not required and other shapes may be used. For example, in some applications of a permanent magnet assembly according to the invention the pole faces could be concave or convex. Thus, the cross-section of the gaps at high magnetic field 94 can include, but not be limited to, a rectangle (including but not limited to a square), a parallelogram, a trapezoid, a circle, an oval, or nearly any other shape or combination of shapes.

Figure 7:
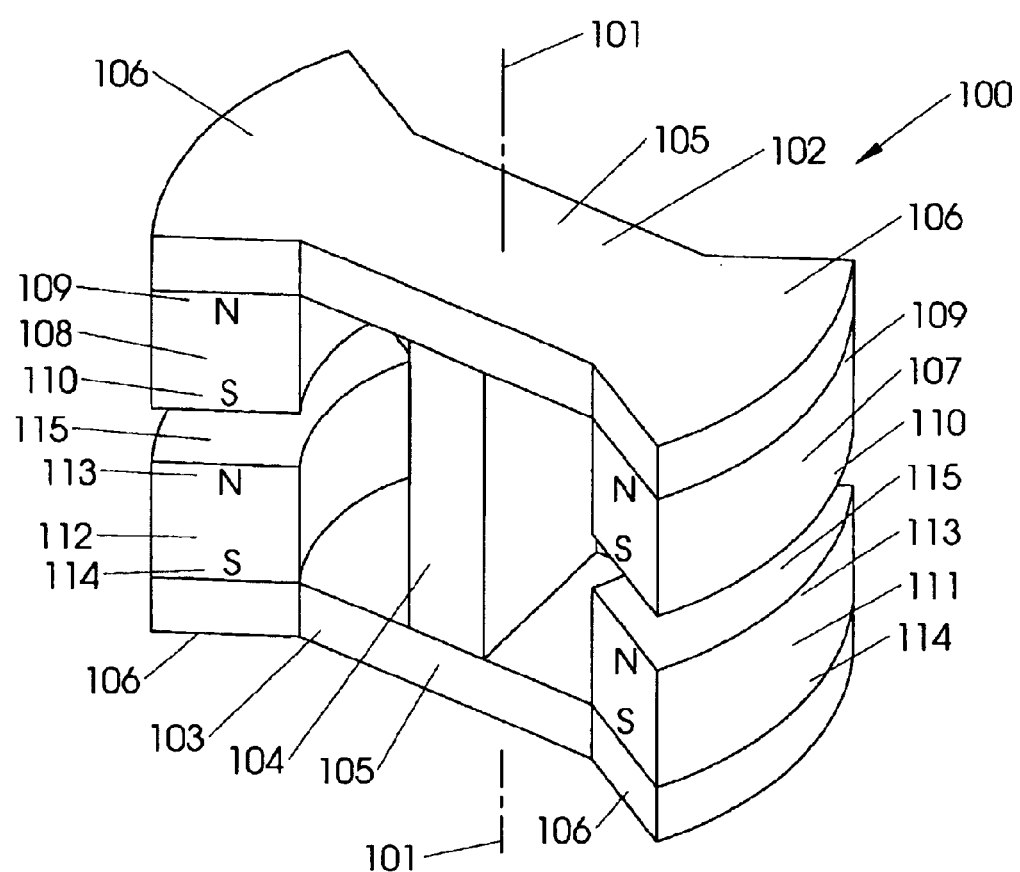
FIG. 7 is a perspective view of an alternative permanent magnet assembly according to the invention with an upper interior flux return path and a lower interior flux return path connected by a central flux return path.

FIG. 7 is a perspective view of an alternative permanent magnet assembly according to the invention, indicated generally at 100, with an upper interior flux return path and a lower interior flux return path connected by a central flux return path. The permanent magnet assembly 100 of FIG. 7 is similar to the permanent magnet assembly 60 of FIG. 4, except that the permanent magnet assembly 100 includes a central flux return path and the permanent magnet sections have different polarities.

By including the central flux return path in the permanent magnet assembly 100, and by aligning the polarities of the permanent magnet sections as shown in FIG. 7, the two arc-shaped gaps in the permanent magnet assembly 100 experience a magnetic field having the same polarity. In contrast, the two arc-shaped gaps at each end of in the permanent magnet assembly 60 shown in FIG. 4 experience a magnetic field having opposite polarities.

Compared to the permanent magnet assembly 60 of FIG. 4, a structure positioned within the annular volume swept by the permanent magnet assembly 100 will experience less magnetic hysteresis, since the magnetic field does not reverse direction at the two ends of the permanent magnet assembly 100. This property can make the permanent magnet assembly 100 especially useful for applications in which it is desirable to minimize magnetic hysteresis.

As shown in FIG. 7, the permanent magnet assembly 100 surrounds two arc-shaped gaps at high magnetic field 115 having a rectangular cross section over a given arc length, although this is not required and the cross-section may have a different shape. Each arc-shaped gap typically extends 60 degrees, although this is not required and greater or lesser arc lengths can be used. The permanent magnet assembly 100 includes an upper flux return portion 102, a lower flux return portion 103, and a central flux portion 104, to provide a return path for the lines of magnetic flux and thereby complete the magnetic circuit. The permanent magnet assembly 100 can be adapted to rotate about an axis of rotation 101, thereby sweeping an annular region.

The upper flux return portion 102 and lower flux return portion 103 each include a central portion 105 extending outward from the axis of rotation 101. The central flux return portion 104 operatively couples the central portion 105 of the upper flux return portion 102 and the central portion 105 of the lower flux return portion 103. The upper flux return portion 102 and lower flux return portion 103 each preferably also include horizontally tapered portions 106 that concentrate the lines of flux in the central portion 105 of the upper flux return portion 102, the central portion 105 of the lower flux return portion 103, and the central flux return portion 104.

In addition to the central flux return portion 104, the permanent magnet assembly 100 may also include one or more non-permeable members between the upper flux return portion 102 and the lower flux return portion 103 to provide additional structural support, although this is not required.

The upper flux return portion 102, lower flux return portion 103, and central flux return portion 104 of the permanent magnet assembly 100 are preferably of sufficient dimension to avoid saturation with magnetic flux and to avoid flux leakage elsewhere in the wheel. The upper flux return portion 102, lower flux return portion 103, and central flux return portion 104 are preferably shaped and positioned at a sufficient distance from the gap at high magnetic field 115 to prevent shunting of the gap flux into those flux return portions. The upper flux return portion 102, lower flux return portion 103, and central flux return portion 104 can be formed of any suitable magnetically permeable material, for example of the types discussed above.

The upper flux return portion 102 has a first end operatively coupled to a first upper permanent magnet portion 107 and a second end operatively coupled to a second upper permanent magnet portion 108, with each of the upper permanent magnet portions 107 and 108 having a North pole 109 (marked "N") and a South pole 110 (marked "S"). Similarly, the lower flux return portion 103 has a first end operatively coupled to a first lower permanent magnet portion 111 and a second end operatively coupled to a second lower permanent magnet portion 112, with each of the lower permanent magnet portions 111 and 112 having a North pole 113 (marked "N") and a South pole 114 (marked "S").

As shown in FIG. 7, the polar orientations of the upper and lower permanent magnet portions 107, 108, 111, and 112 are all aligned in the same direction. This alignment produces two circular flux loops around the magnetic circuits formed by the permanent magnet portions and the upper, lower, and central flux return portions.

The upper permanent magnet portions 107 and 108 and the lower permanent magnet portions 111 and 112 can be formed of any suitable permanent magnet material, for example of the types discussed above. As shown in FIG. 7, the South pole 110 of the first upper permanent magnet portion 107 and the North pole 113 of the first lower permanent magnet portion 111 surround one gap at high magnetic field 115, and the South pole 110 of the second upper permanent magnet portion 108 and the North pole 113 of the second lower permanent magnet portion 112 surround a second gap at high magnetic field 115.

Although in FIG. 7 the upper flux return portion 102 and the lower flux return portion 103 have a uniform thickness in one direction and the central flux return portion 104 has a uniform thickness in two directions, and although these flux return portions can be joined together and to the upper and lower permanent magnet portions 107, 108, 111, and 112 at abrupt corners, other shapes may be used depending on flux density, mounting considerations, and counter-weighting among other factors. The flux return portions can include one or more chamfered or rounded corners, for example along the outer corners or edges of the flux return portions. The flux return portions can also have filled-in corners, for example along the junctions between the flux return portions or the junctions between the flux return portions and the permanent magnet portions. In a particular application, the specific shapes can be chosen, for example, to maximize flux return while minimizing stray flux and assembly weight.

There are various possibilities with regard to alternative embodiments and applications of a magnet assembly according to the invention. Although the exemplary embodiments of the present invention refer to specific materials, other materials known to those skilled in the art as having suitable properties can be appropriately substituted.

Although particular structures and portions of the embodiments described herein are referred to using the terms "upper," "lower," "vertical," and "horizontal," and the like, it is understood that those terms are used in reference to the exemplary orientations shown in the drawings herein. It is understood that a permanent magnet assembly according to the invention can be used in any orientation, and the use of a particular term such as "vertical" or "horizontal" is used to describe the relationship between particular structures and portions of the embodiments described herein and not to limit those structures or portions of the embodiments to any particular orientation or frame of reference.

Although the exemplary embodiments of the present invention show particular shapes and relative dimensions, other shapes and dimensions can be used. For example, although the total arc length at high magnetic field will usually range between 90 and 180 degrees, with 120 degrees being typical, other arc lengths may be used in an appropriate case and the exact arc length is not important to the invention. Further, the total arc length at high magnetic field may be comprised of a single arc-shaped gap at high magnetic field, or the total arc length at high magnetic field may be divided among a plurality of arc-shaped gaps at high magnetic field.

Although the exemplary embodiments of the present invention herein may show individual portions and sections having unitary construction, other constructions can be used. For example, a flux return section or portion can have a unitary construction, or such a flux return section or portion can be comprised of a plurality of pieces which are attached together.

Similarly, a permanent magnet section or portion can have a unitary construction, or such a permanent magnet section or portion can be comprised of a plurality of permanent magnet pieces, possibly including magnetically permeable pieces or magnetically impermeable pieces, which are attached together. For example, a rectangular permanent magnet section may be operatively coupled to an arc-shaped pole piece to obtain a structure which is the equivalent of an arc-shaped permanent magnet section.

Although the exemplary embodiments of the present invention herein may show individual portions and sections having square or rectangular cross-sections, other constructions can be used. For example, a flux return section could have a continuously curved shape, a trapezoidal shape, or any combination of shapes.

Although the exemplary embodiments of the present invention here may show permanent magnet sections or portions positioned adjacent to an arc-shaped gap without any intermediate components, this is not required. For example, one or more pole faces formed of magnetically permeable material may be positioned between the permanent magnet sections or portions and the arc-shaped gap in order to direct or concentrate the magnetic flux through the arc-shaped gap.

The exemplary embodiments herein are described as being adapted to rotate about an axis whereby the permanent magnet assembly provides a gap at high magnetic field that sweeps an annular region, to thereby apply a time-varying magnetic field to the annular region. By rotating the permanent magnet assembly, a time-varying magnetic field can be applied to a structure located within the annular region, such as a ring of beds containing magnetocaloric materials. In this fashion, a rotating permanent magnet assembly according to the invention can be combined with stationary magnetocaloric materials for use in a rotating magnet magnetic refrigerator.

However, it should be understood that a permanent magnet according to the invention can also be used in a stationary configuration, wherein an annular structure, such as a ring of beds containing magnetocaloric materials, is adapted to rotate relative to the permanent magnet assembly. In this fashion, a stationary permanent magnet assembly according to the invention can be combined with rotating magnetocaloric materials for use in a rotating bed magnetic refrigerator.

Of course, a permanent magnet assembly according to the invention can also be used in a configuration in which both the permanent magnet assembly and the magnetocaloric materials rotate, in opposite directions or in the same direction at different angular velocities. Similarly, a permanent magnet assembly according to the invention can be used in a configuration in which either or both of the permanent magnet assembly or the magnetocaloric materials oscillate back and forth or otherwise move relative to each other.

It is understood that the invention is not limited to the particular embodiments described herein, but embraces all such modified forms thereof as come within the scope of the following claims.

What is claimed is:

1. A permanent magnet assembly comprising:

an arc-shaped flux return section formed of magnetically permeable material and extending along a portion of an arc and having an upper portion with a first end and a second end, a lower portion with a first end and a second end, and a middle portion with a first end and a second end, wherein the first end of the upper portion is operatively coupled to the first end of the middle portion and the first end of the lower portion is operatively coupled to the second end of the middle portion;

an upper arc-shaped permanent magnet section having a north end and a south end, wherein the north end of the upper arc-shaped permanent magnet section is operatively coupled to the second end of the upper portion of the arc-shaped flux return section; and a lower arc-shaped permanent magnet section having a north end and a south end, wherein the south end of the lower arc-shaped permanent magnet section is operatively coupled to the second end of the lower portion of the arc-shaped flux return section;

wherein an arc-shaped gap is formed between the south end of the upper arc-shaped permanent magnet section and the north end of the lower arc-shaped permanent magnet section.

2. The permanent magnet assembly of claim 1 wherein the arc-shaped flux return section has a unitary construction.

3. The permanent magnet assembly of claim 1 wherein the arc-shaped flux return section is formed of at least two pieces which are operatively connected to carry magnetic flux.

4. The permanent magnet assembly of claim 1 wherein the upper arc-shaped permanent magnet section has a unitary construction and the lower arc-shaped permanent magnet section has a unitary construction.

5. The permanent magnet assembly of claim 1 wherein at least one of the upper arc-shaped permanent magnet section and the lower arc-shaped permanent magnet section comprises at least two permanent magnet portions.

6. The permanent magnet assembly of claim 1 wherein the arc-shaped gap has a rectangular cross-section.

7. The permanent magnet assembly of claim 1 wherein the arc-shaped gap has a trapezoidal cross-section.

8. The permanent magnet assembly of claim 1 further comprising at least one pole piece operatively coupled to the south end of the upper arc-shaped permanent magnet section.

9. The permanent magnet assembly of claim 1 further comprising at least one pole piece operatively coupled to the north end of the lower arc-shaped permanent magnet section.

10. The permanent magnet assembly of claim 1 further comprising at least one pole piece operatively coupled to the south end of the upper arc-shaped permanent magnet section and at least one pole piece operatively coupled to the north end of the lower arc-shaped permanent magnet section.

11. A permanent magnet assembly comprising:

a central flux return section formed of magnetically permeable material and having an upper portion with a first end and a second end, a lower portion with a first end and a second end, and a central portion with a first end and a second end, wherein the first end of the upper portion is operatively coupled to the first end of the central portion and the first end of the lower portion is operatively coupled to the second end of the central portion;

an upper arc-shaped permanent magnet section having a north end and a south end, wherein the north end of the upper arc-shaped permanent magnet section is operatively coupled to the second end of the upper portion of the central flux return section; and a lower arc-shaped permanent magnet section having a north end and a south end, wherein the south end of the lower arc-shaped permanent magnet section is operatively coupled to the second end of the lower portion of the central flux return section;

wherein an arc-shaped gap is formed between the south end of the upper arc-shaped permanent magnet section and the north end of the lower arc-shaped permanent magnet section.

12. The permanent magnet assembly of claim 11 wherein the central flux return section has a unitary construction.

13. The permanent magnet assembly of claim 11 wherein the central flux return section is formed of at least two pieces which are operatively connected to carry magnetic flux.

14. The permanent magnet assembly of claim 11 wherein the upper arc-shaped permanent magnet section has a unitary construction and the lower arc-shaped permanent magnet section has a unitary construction.

15. The permanent magnet assembly of claim 11 wherein at least one of the upper arc-shaped permanent magnet section and the lower arc-shaped permanent magnet section comprises at least two permanent magnet portions.

16. The permanent magnet assembly of claim 11 wherein the arc-shaped gap has a rectangular cross-section.

17. The permanent magnet assembly of claim 11 wherein the arc-shaped gap has a trapezoidal cross-section.

18. The permanent magnet assembly of claim 11 further comprising at least one pole piece operatively coupled to the south end of the upper arc-shaped permanent magnet section.

19. The permanent magnet assembly of claim 11 further comprising at least one pole piece operatively coupled to the north end of the lower arc-shaped permanent magnet section.

20. The permanent magnet assembly of claim 11 further comprising at least one pole piece operatively coupled to the south end of the upper arc-shaped permanent magnet section and at least one pole piece operatively coupled to the north end of the lower arc-shaped permanent magnet section.

21. A permanent magnet assembly comprising:

an upper flux return section formed of magnetically permeable material and having a middle section, a first end, and a second end;

a first arc-shaped upper permanent magnet section having a south end, and a north end operatively coupled to the first end of the upper flux return section;

a second arc-shaped upper permanent magnet section having a north end, and a south end operatively coupled to the second end of the upper flux return section;

a lower flux return section formed of magnetically permeable material and having a middle section, a first end, and a second end;

a first arc-shaped lower permanent magnet section having a north end, and a south end operatively coupled to the first end of the lower flux return section; and a second arc-shaped lower permanent magnet section having a south end, and a north end operatively coupled to the second end of the lower flux return section;

wherein a first arc-shaped gap is formed between the south end of the first arc-shaped upper permanent magnet section and the north end of the first arc-shaped lower permanent magnet section and wherein a second arc-shaped gap is formed between the north end of the second arc-shaped upper permanent magnet section and the south end of the second arc-shaped lower permanent magnet section.

22. The permanent magnet assembly of claim 21 wherein the upper flux return section has a unitary construction and the lower flux return section has a unitary construction.

23. The permanent magnet assembly of claim 21 wherein at least one of the upper flux return section and the lower flux return section is formed of at least two pieces which are operatively connected to carry magnetic flux.

24. The permanent magnet assembly of claim 21 wherein the first arc-shaped upper permanent magnet section, the first arc-shaped lower permanent magnet section, the second arc-shaped upper permanent magnet section, and the second arc-shaped lower permanent magnet section all have a unitary construction.

25. The permanent magnet assembly of claim 21 wherein at least one of the first arc-shaped upper permanent magnet section and the first arc-shaped lower permanent magnet section comprises at least two permanent magnet portions, and wherein at least one of the second arc-shaped upper permanent magnet section and the second arc-shaped lower permanent magnet section comprises at least two permanent magnet portions.

26. The permanent magnet assembly of claim 21 wherein the first arc-shaped gap has a rectangular cross-section and the second arc-shaped gap has a rectangular cross-section.

27. The permanent magnet assembly of claim 21 wherein the first arc-shaped gap has a trapezoidal cross-section and the second arc-shaped gap has a trapezoidal cross-section.

28. The permanent magnet assembly of claim 21 further comprising at least one pole piece operatively connected to the south end of the first arc-shaped upper permanent magnet section and at least one pole piece operatively connected to the north end of the second arc-shaped upper permanent magnet section.

29. The permanent magnet assembly of claim 21 further comprising at least one pole piece operatively coupled to the north end of the first arc-shaped lower permanent magnet section and at least one pole piece operatively coupled to the south end of the second arc-shaped lower permanent magnet section.

30. The permanent magnet assembly of claim 21 further comprising at least one pole piece operatively coupled to the south end of the first arc-shaped upper permanent magnet section and at least one pole piece operatively coupled to the north end of the first arc-shaped lower permanent magnet section.

31. A permanent magnet assembly comprising:

a central permanent magnet section having a north end and a south end;

an upper pole piece formed of magnetically permeable material and having a first end bearing an arc-shaped side pole piece portion having a pole face, and a second end bearing an arc-shaped side pole piece portion having a pole face; and a lower pole piece formed of magnetically permeable material and having a first end bearing an arc-shaped side pole piece portion having a pole face, and a second end bearing an arc-shaped side pole piece portion having a pole face;

wherein a first arc-shaped gap is formed between the pole face of the arc-shaped side pole piece portion of the first end of the upper pole piece and the pole face of the arc-shaped side pole piece portion of the first end of the lower pole piece and a second arc-shaped gap is formed between the pole face of the arc-shaped side pole piece portion of the second end of the upper pole piece and the pole face of the arc-shaped side pole piece portion of the second end of the lower pole piece.

32. The permanent magnet assembly of claim 31 wherein the first arc-shaped gap has a rectangular cross-section and the second arc-shaped gap has a rectangular cross-section.

33. The permanent magnet assembly of claim 31 wherein the first arc-shaped gap and the second arc-shaped gap each have a trapezoidal cross-section with an interior dimension and an exterior dimension, wherein the interior dimension is less than the exterior dimension.

34. The permanent magnet assembly of claim 31 wherein the first arc-shaped gap and the second arc-shaped gap each have a trapezoidal cross-section with an interior dimension and an exterior dimension, wherein the interior dimension is greater than the exterior dimension.

35. The permanent magnet assembly of claim 31 wherein the upper pole piece has a unitary construction and the lower pole piece has a unitary construction.

36. The permanent magnet assembly of claim 31 wherein at least one of the upper pole piece and the lower pole piece is formed of at least two pieces which are operatively connected to carry magnetic flux.

37. The permanent magnet assembly of claim 31 wherein the central permanent magnet section has a unitary construction.

38. The permanent magnet assembly of claim 31 wherein the central permanent magnet section comprises at least two permanent magnet portions.

39. A permanent magnet assembly comprising:
an upper flux return section formed of magnetically permeable material and having a middle portion, a first end, and a second end;
a first arc-shaped upper permanent magnet section having a south end, and a north end operatively coupled to the first end of the upper flux return section;
a second arc-shaped upper permanent magnet section having a south end, and a north end operatively coupled to the second end of the upper flux return section;
a lower flux return section formed of magnetically permeable material and having a middle portion, a first end, and a second end;
a first arc-shaped lower permanent magnet section having a north end, and a south end operatively coupled to the first end of the lower flux return section;
a second arc-shaped lower permanent magnet section having a north end, and a south end operatively coupled to the second end of the lower flux return section; and
a central flux return section formed of magnetically permeable material and having a middle section, a first end operatively coupled to the middle portion of the upper flux return section, and a second end operatively coupled to the middle portion of the lower flux return section;

wherein a first arc-shaped gap is formed between the south end of the first arc-shaped upper permanent magnet section and the north end of the first arc-shaped lower permanent magnet section and wherein a second arc-shaped gap is formed between the south end of the second arc-shaped upper permanent magnet section and the north end of the second arc-shaped lower permanent magnet section.

40. The permanent magnet assembly of claim 39 wherein the first arc-shaped gap has a rectangular cross-section and the second arc-shaped gap has a rectangular cross-section.

41. The permanent magnet assembly of claim 39 wherein the first arc-shaped gap and the second arc-shaped gap each have a trapezoidal cross-section with an interior dimension and an exterior dimension, wherein the interior dimension is less than the exterior dimension.

42. The permanent magnet assembly of claim 39 wherein the first arc-shaped gap and the second arc-shaped gap each have a trapezoidal cross-section with an interior dimension and an exterior dimension, wherein the interior dimension is greater than the exterior dimension.

43. The permanent magnet assembly of claim 39 wherein the upper flux return section has a unitary construction, the central flux return section has a unitary construction, and the lower flux return section has a unitary construction.

44. The permanent magnet assembly of claim 39 wherein at least one of the upper flux return section, the central flux return section, and the lower flux return section is formed of at least two pieces which are operatively connected together to carry magnetic flux.

45. The permanent magnet assembly of claim 39 wherein the first arc-shaped upper permanent magnet section and the second arc-shaped upper permanent magnet section each have a unitary construction.

46. The permanent magnet assembly of claim 39 wherein the first arc-shaped upper permanent magnet section and the second arc-shaped upper permanent magnet section each comprise at least two permanent magnet portions.

47. The permanent magnet assembly of claim 39 wherein at least one of the first arc-shaped lower permanent magnet section and the second arc-shaped lower permanent magnet section has a unitary construction.

48. The permanent magnet assembly of claim 39 wherein at least one of the first arc-shaped lower permanent magnet section and the second arc-shaped lower permanent magnet section comprises at least two permanent magnet portions.

49. The permanent magnet assembly of claim 39 further comprising at least one pole piece operatively connected to the south end of the first arc-shaped upper permanent magnet section and at least one pole piece operatively connected to the south end of the second arc-shaped upper permanent magnet section.

50. The permanent magnet assembly of claim 39 further comprising at least one pole piece operatively coupled to each of the north end of the first arc-shaped lower permanent magnet section and the north end of the second arc-shaped lower permanent magnet section.

* * * * *